United States Patent
Qui et al.

(10) Patent No.: US 7,592,787 B2
(45) Date of Patent: Sep. 22, 2009

(54) ADAPTIVE FIRING ORDER CONTROL FOR DYNAMIC CURRENT BALANCE OF MULTIPHASE VOLTAGE REGULATORS

(75) Inventors: Weihong Qui, San Jose, CA (US);
Shangyang Xiao, Sunnyvale, CA (US);
Robert H. Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 390 days.

(21) Appl. No.: 11/694,308

(22) Filed: Mar. 30, 2007

(65) Prior Publication Data
US 2008/0197824 A1 Aug. 21, 2008

Related U.S. Application Data

(60) Provisional application No. 60/887,947, filed on Feb. 2, 2007.

(51) Int. Cl.
*G05F 1/59* (2006.01)
*G05F 1/565* (2006.01)
(52) U.S. Cl. .................. 323/272; 323/282; 323/283
(58) Field of Classification Search .............. 323/271, 323/272, 283, 285, 286; 327/175; 307/58
See application file for complete search history.

(56) References Cited

U.S. PATENT DOCUMENTS

| | | | | |
|---|---|---|---|---|
| 6,414,470 B1 * | 7/2002 | Liu et al. | .................. | 323/272 |
| 6,515,460 B1 * | 2/2003 | Farrenkopf | .................. | 323/272 |
| 6,747,442 B2 * | 6/2004 | Olsen et al. | .................. | 323/283 |
| 6,806,689 B2 * | 10/2004 | Schuellein et al. | .......... | 323/272 |
| 7,023,188 B1 * | 4/2006 | Rice | ........................... | 323/271 |
| 7,414,383 B2 * | 8/2008 | Burton et al. | ............... | 323/271 |
| 2007/0290664 A1 * | 12/2007 | Moyer et al. | ................ | 323/272 |

* cited by examiner

*Primary Examiner*—Jeffrey L Sterrett
*Assistant Examiner*—Fred E Finch, III
(74) *Attorney, Agent, or Firm*—Akerman Senterfitt

(57) ABSTRACT

A pulse width modulation (PWM) modulator for a multiphase power converter and related adaptive firing order (AFO) method includes a multiphase leading edge generator having pulse generating circuitry associated with each of the regulator phases, wherein the pulse generating circuitry generates phase pulses associated with each of the phases. An adaptive firing order (AFO) controller having circuitry including a mixer receives and sums the phase pulses into a summing signal and uses the summing signal to generate a series of turn-on pulses therefrom. A multiphase PWM generator has inputs coupled to an output of the AFO controller coupled to receive the series of turn-on pulses, the multiphase PWM generator having circuitry for generating said PWM signals therefrom. An adaptive firing order (AFO) controlled multi-phase power converter includes a plurality of parallel connected regulator phases controlled by respective pulse width modulation (PWM) signals provided by the PWM modulator.

20 Claims, 17 Drawing Sheets

Traces from top to bottom: inductor current, load current, and PWMs

PRIOR ART
Imbalanced phase current with APP PMW modulator (APA is disabled)

zoom-in waveforms
PRIOR ART a. PWM modulator block diagram

Simple schematic for 3-phase system

Traces from top to bottom: inductor current, load current, and PWM's zoom-in waveforms Comparison between the proposed scheme and original scheme 2. Transient load rep rate=290kHz with 85% Duty cycle Known scheme — Invention

US 7,592,787 B2

ADAPTIVE FIRING ORDER CONTROL FOR DYNAMIC CURRENT BALANCE OF MULTIPHASE VOLTAGE REGULATORS

CROSS-REFERENCE TO RELATED APPLICATIONS

This application claims the benefit of Provisional Application No. 60/887,947 entitled "ADAPTIVE FIRING ORDER CONTROL FOR DYNAMIC CURRENT BALANCE OF MULTIPHASE VOLTAGE REGULATORS" filed on Feb. 2, 2007, which is incorporated by reference in its entirety in the present application.

FIELD OF THE INVENTION

The invention relates to pulse width modulator-driven multi-phase power regulators, in particular to regulator controllers and associated firing order control schemes for improving dynamic current balance of such regulators, particularly under highly repetitive high frequency transient events.

BACKGROUND OF THE INVENTION

Multi-phase or multi-channel power conversion with current sharing control are commonly employed techniques for DC-DC power conversion in today's electronics (e.g. personal computer) market. Multi-phase power conversion provides a cost-effective power solution when load currents cannot be readily supported by single-phase converters. In a multi-phase system, the switching on of each channel is generally timed to be symmetrically out of phase with each of the other channels.

Conventional multiphase converters comprise a plurality of parallel connected regulators which each including pulse width modulation (PWM) modulators, each PWM modulator providing one phase for the converter. PWM modulators are generally each provided dedicated up-ramp and down-ramp signals and a pair of comparators for controlling pulse width. For example, for active pulse positioning (APP™) control for the multiphase PWM modulator 100 shown in FIG. 1, the rising edge of each phase PWM (PWM_1, PWM_2, etc.) output pulse trigger depending on its own dedicated down-ramp signal ($V_{DOWN\_RAMP}$), while the duty cycle of the pulse is determined by its own dedicated up-ramp signal ($V_{UP\_RAMP}$). The relationship between the up-ramp and the down-ramp signals is fixed as shown in FIG. 1. The down-ramps for the respective phases are determined by the system clock and are shifted relative to one another with a fixed phase angle. Therefore, there exists the possibility for a phase to miss one or more pulses during large repetitive load transients.

In FIG. 2, simulation results are shown for a multiphase converter based on the active pulse positioning (APP™) multiphase PWM modulator shown in FIG. 1. The upper panel shows the respective inductor currents for the various phases (I(L1), I(L2) and I(L3)), the center panel the respective phase output pulses (PWM_1, PWM_2 and PWM_3), and the lower panel the respective downramp waveforms (1, 2 and 3) together with the $V_{COMP}$ signal from the error amplifier (not shown).

Due to the fixed relationship between the up-ramp and the down-ramp signals, one phase will miss a pulse if the COMP signal ($V_{COMP}$) from the error amplifier remains at levels below the valley point of the phases' down ramp, as shown in the circled regions in FIG. 2. As shown in FIG. 2, PWM-2 misses three (3) pulses.

Besides missed PWM pulses, under highly repetitive high frequency transient events, the turn-on time and duration of each phase PWM may vary significantly from cycle to cycle. Such variation can result in large dynamic imbalanced phase currents as shown in FIG. 3(a), which shows (from top to bottom) the respective inductor currents, the load current, and the respective PWM waveforms. FIG. 3(b) shows a zoom-in view of the same waveforms shown in FIG. 3(a).

This unbalanced phase current issue exists in all conventional pulse width modulation schemes, including trailing-edge, leading-edge or dual-edge modulators. In Robust Ripple Regulator, R3 TECHNOLOGY™, referred to herein as R3 control, a circuit architecture is provided which stabilizes current flow and reduces the time allowed between wave peaks in the regulator circuit. In R3™ control, there is a master clock block and several slave blocks. The master block generates and distributes a turn-on pulse to the slave blocks which creates PWM pulses. Because there is only one clock signal as the turn-on pulse, the turn-on pulse is sent to the slave blocks in a particular fixed firing order, such as: phase #1, #2, #3, #1 . . . . This arrangement can avoid the missing phase pulse problem described above, generally resulting in better dynamic current balance.

However, the current balance circuit in R3™-based designs provides a response that is a relatively low bandwidth to provide enhanced stability, which can keep the average phase current balanced. As a result, the R3™-response cannot generally solve the dynamic imbalanced phase current issue under highly repetitive high frequency transient events. The dynamic imbalanced phase current issue may cause very high instantaneous current in one phase, with huge negative current in another phase, and can cause damage or triggering of over-current protection circuitry. Dynamic imbalanced phase current is also known to reduce the power efficiency of the multi-phase regulator. What is needed is a new multi-phase regulator controller architecture and associated control methodology which provides improved dynamic current balance, particularly under highly repetitive high frequency transient events.

SUMMARY

An adaptive firing order (AFO) controlled multi-phase power converter comprises a plurality of parallel connected regulator phases controlled by respective pulse width modulation (PWM) signals, the regulator phases each comprising at least one driver having an input coupled to receive the PWM signals. An output stage comprising at least one output transistor has an input coupled to an output of the driver, the output stage operable for driving an inductor in series with a capacitor, wherein outputs of the modulators taken across the capacitor are tied together to provide an output of said converter ($V_{OUT}$). $V_{OUT}$ generates a load current across a load when connected across the capacitor.

A PWM modulator according to the invention comprises a multiphase leading edge generator comprising pulse generating circuitry associated with each of the regulator phases, the pulse generating circuitry generating phase pulses associated with each of the phases, and an AFO controller. The AFO controller includes circuitry including a mixer for receiving and summing the phase pulses into a summing signal and using the summing signal to generate a series of turn-on pulses therefrom. A multiphase PWM generator has inputs coupled to an output of the AFO controller coupled to receive the series of turn-on pulses, the multiphase PWM generator having circuitry for generating the PWM signals therefrom. Although generally described herein relative to non-coupled designs, the present invention is applicable to both coupled or non-coupled converter designs.

The AFO controller can includes at least one D flip flop, wherein the summing signal is coupled to a clock input of the D-flip flop. In another embodiment, the AFO controller includes a plurality of D flip flops, one of the D flip flops for each of the phases, wherein the summing signal is coupled to a clock input of each of the plurality of D-flip flops.

In another embodiment, the leading edge generator comprises a down ramp comparator for each of the phases, wherein a COMP signal from an error amplifier is coupled to an inverting input of the down ramp comparator and a down ramp signal to its non-inverting input, and the multiphase PWM generator comprises an up-ramp comparator and an SR flip-flop for each of the phases, the COMP signal being coupled to an inverting input and an up ramp signal to its non-inverting input. An output of the up ramp comparator is coupled an R input of the SR flip-flops, and the series of turn-on pulses to S inputs of the SR flip flops, wherein outputs of the SR flip-flops provide the PWM signals. In this embodiment, outputs of the downramp comparators can be coupled to inputs of the AFO controller along with a non-linear control input and a signal representative of current delivered by the regulator phases.

In one embodiment the series of turn-on pulses from said AFO controller are treated as a master clock signal, slave signals derived from said master clock signal being sent to each of said phases in a predetermined fixed order, whereby a fixed firing order of said phases is provided. In another embodiment, signals indicative of phase currents associated with each of said phases are provided as inputs to the AFO controller, the AFO controller generating turn on pulses to the PWM generator based on respective levels of the phase currents, whereby a firing order of said phases is dynamically adjusted based on the phase currents. In another embodiment, the AFO controller generates the turn on pulses to turn on respective ones of the phases which provide less phase current more frequently by sending more turn-on pulses relative to others of the phases.

A pulse width modulation (PWM) modulator comprises a multiphase leading edge generator comprising pulse generating circuitry associated with each of the regulator phases, the pulse generating circuitry generating phase pulses associated with each of the phases. An adaptive firing order (AFO) controller has circuitry including a mixer for receiving and summing the phase pulses into a summing signal and using the summing signal to generate a series of turn-on pulses therefrom. A multiphase PWM generator has inputs coupled to an output of the AFO controller coupled to receive the series of turn-on pulses, the multiphase PWM generator having circuitry for generating PWM signals therefrom.

A method for improved dynamic current balance for multiphase voltage regulators comprises the steps of providing a multiphase voltage regulator having a plurality of parallel connected regulator phases controlled by a multiphase PWM generator which generates pulse width modulator (PWM) signals for respective ones of the regulator phases, generating phase pulses associated with each of the phases, and mixing the phase pulses into a summing signal and using the summing signal to generate a series of turn-on pulses therefrom. The series of turn-on pulses applied as inputs to said multiphase PWM generator, wherein the series of turn-on pulses determines a firing order of respective ones of the regulator phases. The firing order can be a fixed order. In another embodiment, the mixing step can comprises receiving output current information from each of the regulator phases, wherein the output current information can be used to change a frequency of the turn-on pulses to the regulator phases, wherein phases which provide low output current receive turn-on pulses at a higher frequency as compared to the phases which provide higher output current.

BRIEF DESCRIPTION OF THE DRAWINGS

A fuller understanding of the present invention and the features and benefits thereof will be accomplished upon review of the following detailed description together with the accompanying drawings, in which:

FIG. 6(a) shows simulated operational waveforms of an exemplary 2-phase system based on known APP™ control, while

DETAILED DESCRIPTION

As noted in the background, abrupt load changes may result in significantly unbalanced phase currents for multiphase voltage regulators. The present invention provides a new regulator architecture which implements a new adaptive firing order (AFO) scheme which significantly improves dynamic current balance by adjusting the firing order of PWM signal, particularly under highly repetitive high frequency transient events, such as commonly encountered in computing systems which are known to feature high-frequency large dynamic load changes. Besides providing improved dynamic current balance, the present invention also provides improved power efficiency. The present AFO-based invention is implemented together with one of a variety of pulse width modulation schemes, such as, but not limited to active pulse positioning (APP™), trailing-edge, leading-edge or dual-edge modulation.

Figure 1:
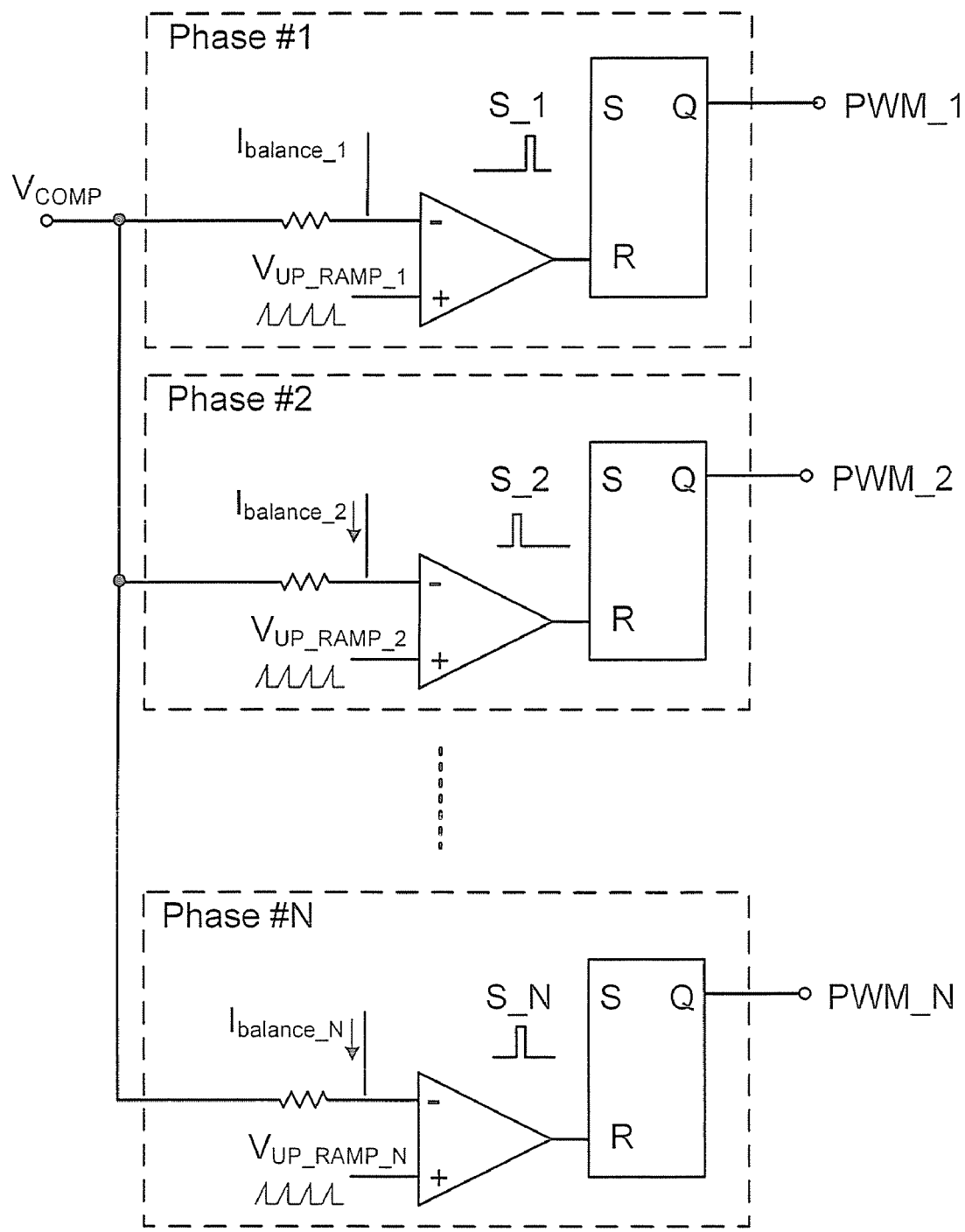
FIG. 1 shows a known active pulse positioning (APP™) multiphase PWM modulator for a multiphase converter.
Figure 2:
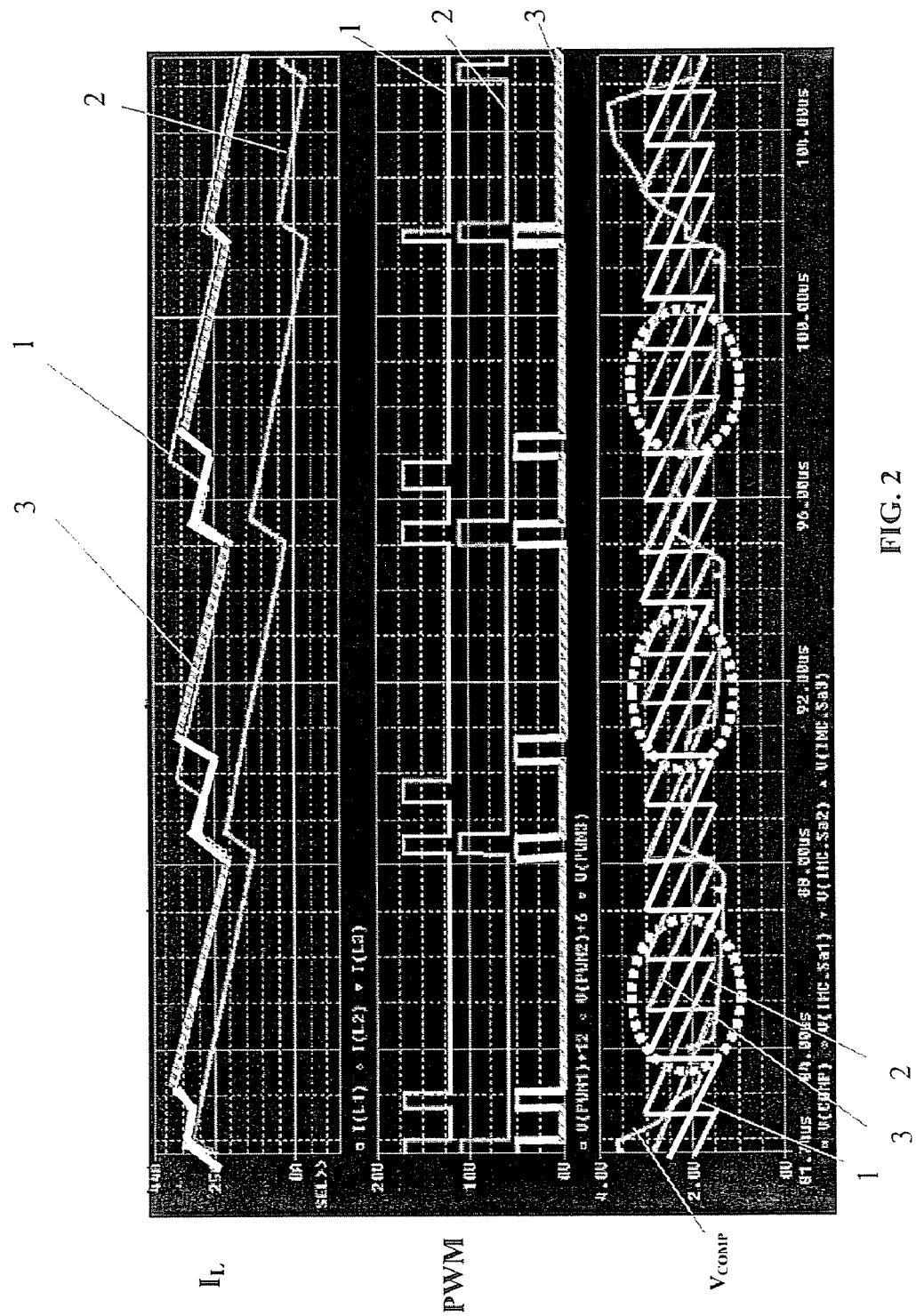
FIG. 2 shows simulation results for the multiphase converter based on the APP™ multiphase PWM modulator shown in FIG. 1 operated under highly repetitive high frequency transient events showing several missed pulses for PWM_2 (circled regions).
Figure 3:
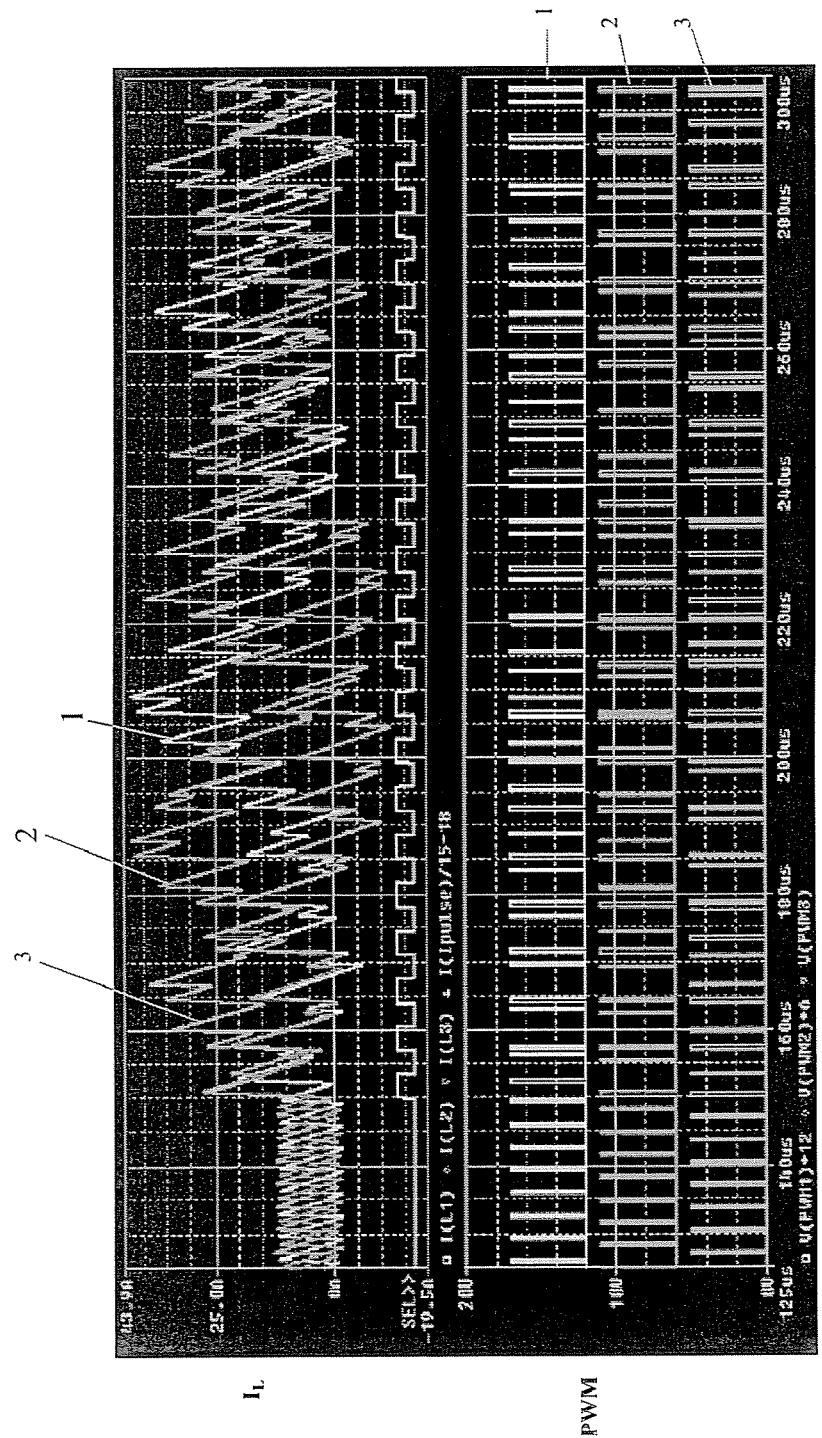
FIG. 3(a) shows simulation results for a multiphase converter based on the APP™ multiphase PWM modulator shown in FIG. 1 operated under highly repetitive high frequency transient events, showing the turn-on time and duration of each phase PWM varying significantly from cycle to cycle resulting in large dynamic imbalanced phase currents.
FIG. 3(b) shows a zoom-in view of the same waveforms shown in FIG. 3(a).
Figure 3:
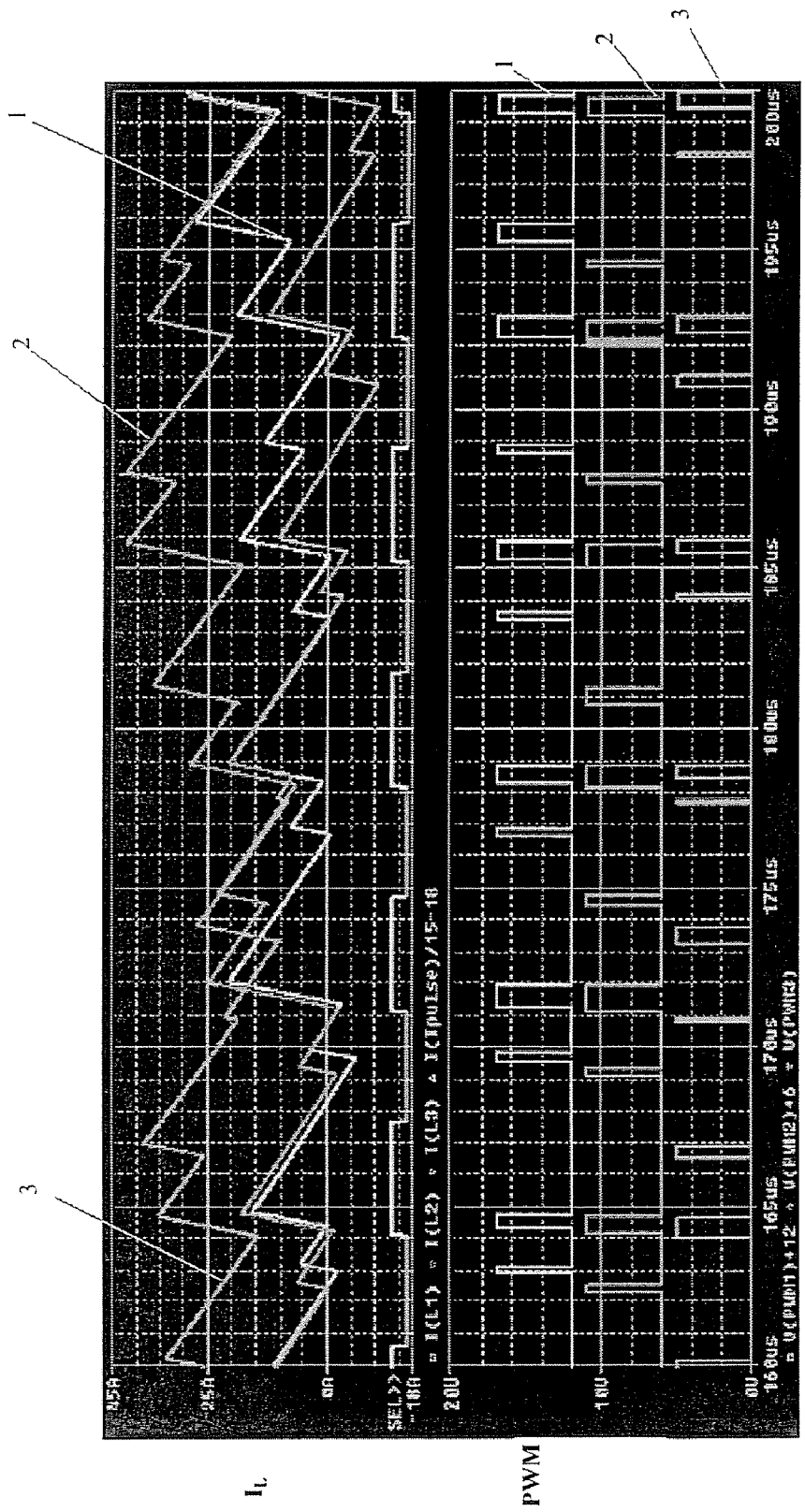

When the output of the down-ramp comparator becomes high, one phase needs to be on in response to the output voltage change which is reflected in $V_{COMP}$ signal provided by the error amplifier. In contrast to earlier designs, such as the APP™ PWM modulator design shown in FIG. 1, the present inventive arrangement does not require a particular phase to turn on at the moment its associated down-ramp comparator becomes high. Since the output voltage waveforms from the multi-phase regulator is similar when any one phase is turned on for the same duty cycle at the same time due to the close matching of the respective phases resulting from being on the same chip, removing the correspondence between a particular down-ramp signal and a particular PWM phase does not generate any significant output error.

Thus, based on the present invention, it is no longer necessary to relate one down-ramp signal to a dedicated phase. In one embodiment, the outputs from all down-ramp comparators are summed to form a summing signal which is used to generate a series turn-on pulses, where any phase can be turned on by any down-ramp or other trigger signal associated with any of the phases becoming high, such as implementing a fixed firing order. In another embodiment, by distributing the turn-on pulses based on the instantaneous current information from the respective phases, the firing order of the respective phases can be adjusted, such as dynamically, to further improve the dynamic current balance.

The relationship between the down-ramp and the up-ramp signals can also be flexible. The down ramp comparators each generate phase pulses. Phase pulses from the respective down ramp comparators can be interleaved and mixed. The interleaved phase pulses can be treated analogous to the master clock signal in the R3™ control scheme, and sent to each phase in a proper phase order, either a fixed order or a non-fixed order, such as the phase orders shown in FIGS. 7(a)-(d), which shows exemplary phase orders for a 2, 3 and 4 phase system with 1 change, and 4 phase system with 2 changes, respectively. The fixed firing order can be regarded as one special or simplified example of AFO.

Figure 4A:
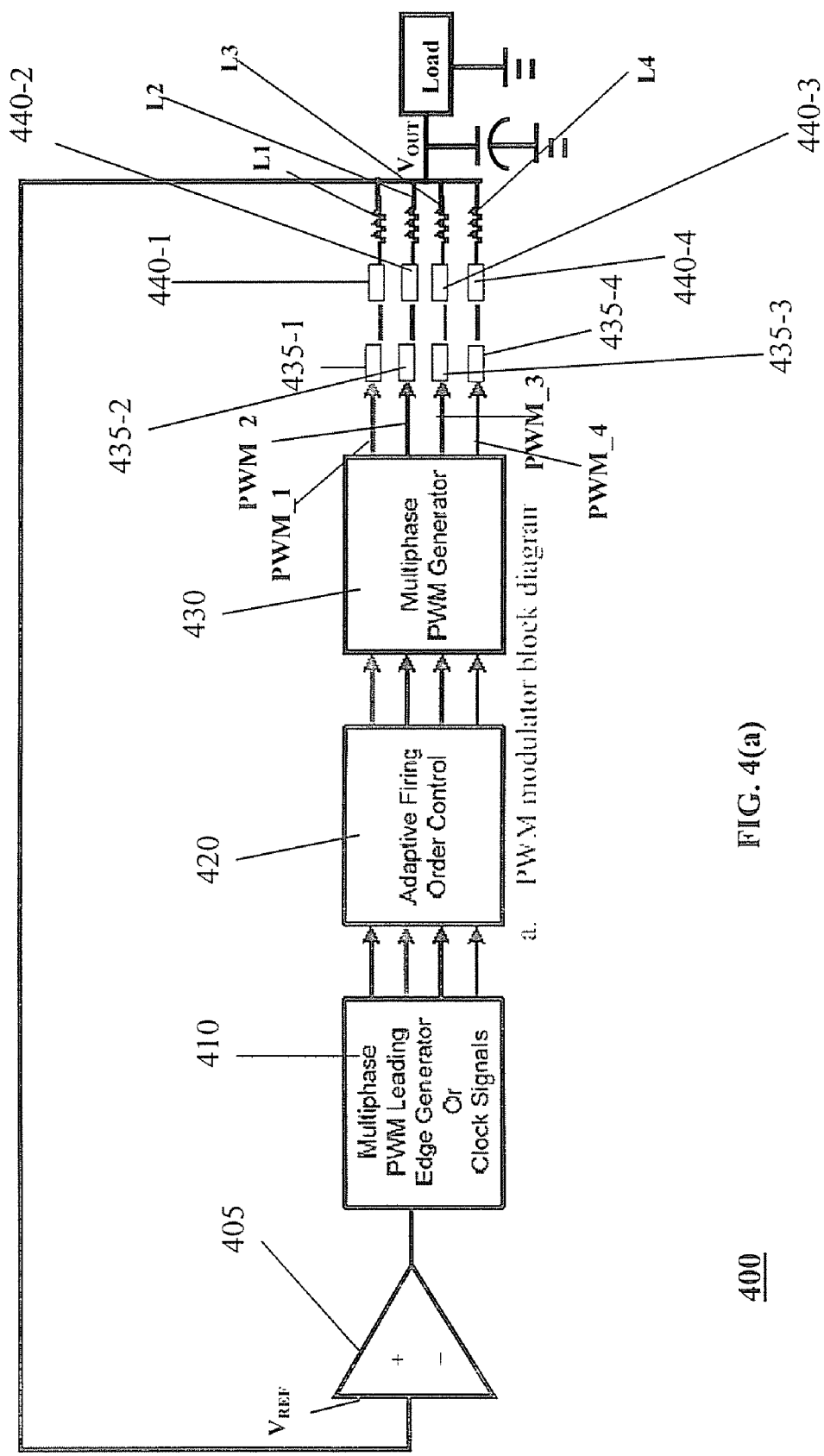
FIG. 4(a) is a block diagram for a multi-phase PWM converter according to the invention which includes an error amplifier driving a PWM leading edge generator or clock signals block, coupled to an adaptive firing order (AFO) control block, which is coupled to a multi-phase PWM generator block, which drives serially connected drivers, output switches, and inductors which are all coupled to a common output, $V_{OUT}$.

A block diagram for a multi-phase (4 phase) PWM converter according to the invention 400 is shown in FIG. 4(a). Although converter 400 is a non-coupled design, as noted above, the present invention is applicable to both coupled or non-coupled converter designs. Converter 400 includes an error amplifier 405 with its output coupled to multiphase PWM leading edge generator or clock signals block 410. As used herein, a "leading edge generator or clock signals block" is any suitable circuitry for triggering PWM pulses. The leading edge generator can thus trigger using conventional schemes including a fixed clock or a comparator output based on down ramp and COMP signal inputs as noted above. A variety of other leading edge schemes or signals to turn on the PWM pulse can be used with the present invention. PWM leading edge generator or clock signal block 410 is coupled to an adaptive firing order (AFO) control block 420. AFO 420 is coupled to a multi-phase PWM generator block 430, which outputs PWM_1, 2, 3 and 4. The PWM outputs are coupled to drivers 435-1 to 435-4, which drive output switches 440-1 to 440-4, outputs of the output switches being coupled to respective inductors L1-L4. $V_{OUT}$ is connected to the output side of inductors L1-L4. A load is shown connected between $V_{OUT}$ and ground, with feedback from $V_{OUT}$ to the inverting input of error amplifier 405.

Figure 4B:
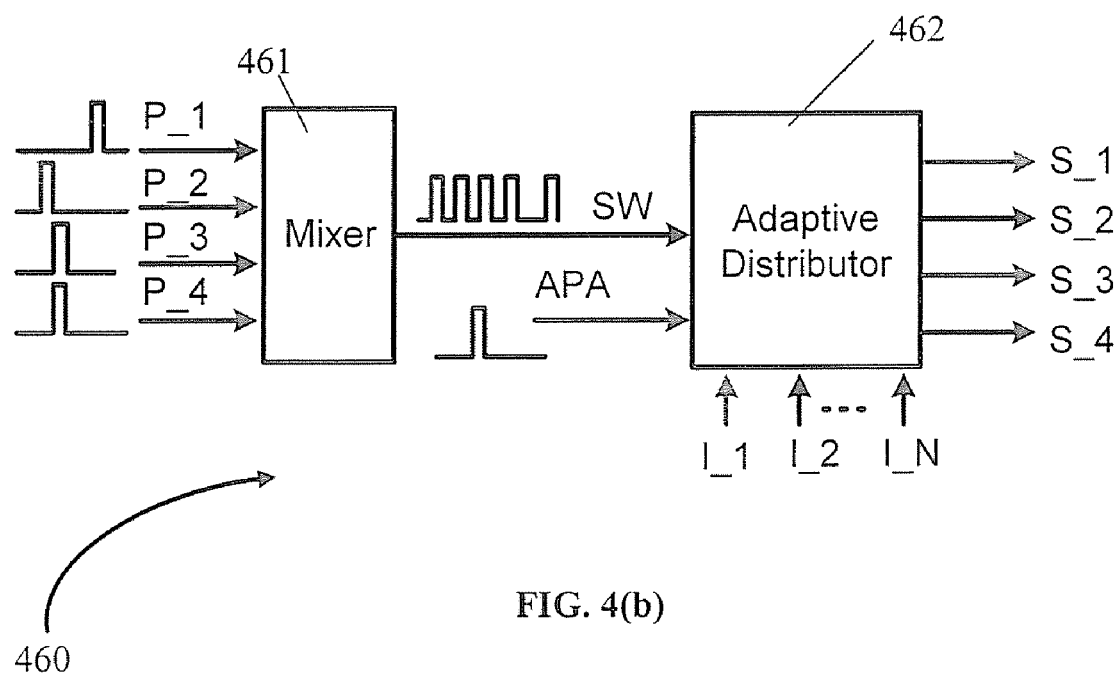
FIG. 4(b) is a block diagram for an exemplary AFO control block shown in FIG. 4(a), which as shown can comprise a mixer coupled to an adaptive distributor.

FIG. 4(b) is a block diagram for an exemplary AFO control block 460, which can comprise mixer 461 coupled to adaptive distributor 462. For a master-slave system like an infinite-phase architecture, the series pulses SW signal from mixer 461 are sent to adaptive distributor 462 along with an APA™ signal, where adaptive distributor 422 functions as a phase controller to turn on the respective phases one by one. Adaptive phase alignment (APA™) is based on a circuit architecture that uses a single pulse signal which enables the turn-on of all phases simultaneously, such as disclosed in U.S. Pat. No. 6,696,825 to Harris et. al. entitled "DC-to-DC converter with fast override feedback control and associated methods" which is incorporated into the present application by reference in its entirety. APA™ as described in '825 triggers only when the output of the error amplifier 405 (Vcomp) sees a high rate voltage change dv/dt, such as when a high load transition is applied to $V_{OUT}$. APA™ commands all phases on simultaneously (rather than with a symmetric phase shift) to meet the high load demand.

Figure 5:
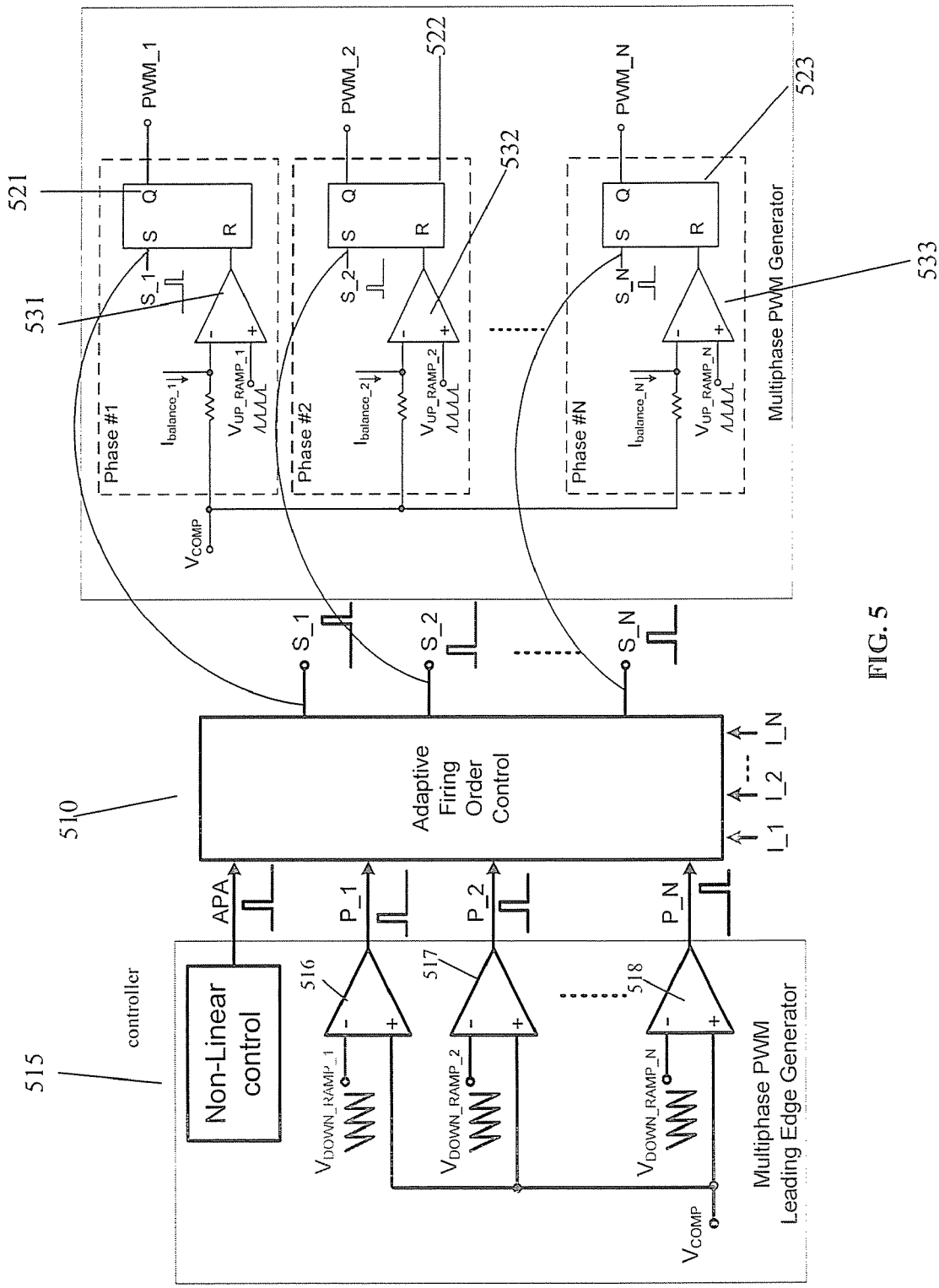
FIG. 5 shows an APP™ modulator having an AFO control circuit arrangement according to the invention.

FIG. 5 shows an APP™ modulator 500 having an AFO circuit arrangement according to the invention. Outputs from all the down ramp comparators 516-518 shown as P_1, P_2, P_N are received as inputs by AFO control block 510 along with a non-linear control input, shown as an APA™ input, from a non-linear controller 515. The non-linear controller 515 can be an APA™ circuit, or more generally a circuit that more generally senses dv/dt and decides whether to command all phases to be on simultaneously. Optional phase currents I_1, I_2, I_3 are also shown as inputs to AFO 510. Phase current information (e.g. I_1, I_2, I_N) is not needed for a fixed firing order embodiments according to the invention, but is generally necessary for the AFO embodiments where the switching order is changed. The respective pulse outputs from AFO control block 510 (S_1, S_2, . . . ) are connected to the S input of SR flip-flops 521-523 associated with each PWM phase, while the output of up-ramp comparators 531-533 are connected to the R input of the respective SR flip-flops 521-523.

In one embodiment of the invention, the firing order of the respective phases is adjusted to distribute the turn-on pulses at a fixed phase order analogous to R3 control, such as phase #1, #2, #3, #1, #2 . . . . Such a firing order will help to keep all phase currents close to each other under highly repetitive high frequency transient events and avoid missed pulses.

However, a fixed phase order cannot solve the dynamic imbalance issue under certain conditions. For example, if the transient event happens at a repetition frequency substantially equal to the phase switching frequency, the COMP voltage may always be at a lower level when one specific phase is on. For example, if the switching frequency is 300 kHz, 250 kHz, or greater than about 80% of the switching frequency and above can be defined as being "substantially equal". As a result, the duty cycle for that phase will be smaller than the other phases, and the phase current will become lower and lower until the current balance circuit starts to correct.

To further improve the dynamic current balance under conditions such as when transient events happen at a repetition frequency substantially equal to the phase switching frequency, the firing order can be adjusted based on the respective phase currents using a new algorithm. As noted above, AFO control block 510 shown in FIG. 5 receives the respective phase currents I_1, I_2, I_N as inputs. This new algorithm allows turning on the phase which is providing the least output current, and turning on the low output current phase earlier as compared to when the low current phase would turn on using a fixed firing order. For an exemplary 2-phase system, the turn-on pulses can be sent to the phase providing less output current to improve current balance. For more than a 2-phase system, the phases providing less relative output current may be turned on more frequently to increase their current, but there is generally a need to avoid pushing the switching frequency of a phase too high, because as known in the art, running one phase with a higher frequency than other phases can cause high EMI noise, thermal unbalance, and other undesirable effects.

In another embodiment of the present invention, the invention allows another one or two phases on before the same phase is on again. This embodiment also applies for multiphase controllers with conventional PWM modulation schemes. Herein, peak current mode control is described only as an example. There are a series of clock signals in the multiphase controller with the peak current mode control, and those clock signals are out of phase with constant interval. Each clock signal is sent to one specific phase to turn on the PWM associated with that particular phase. Therefore one phase may miss one pulse if overshooting happens before its PWM starts. Dynamic current balance is thus not effective if the transient repetitious rate is close to the switching frequency. To improve the current balance, the AFO scheme according to the present invention can be adopted. According to the present invention, all clock signals can be mixed and distributed at a fixed order, or distributed dynamically based on the phase currents as described above.

Figure 6:
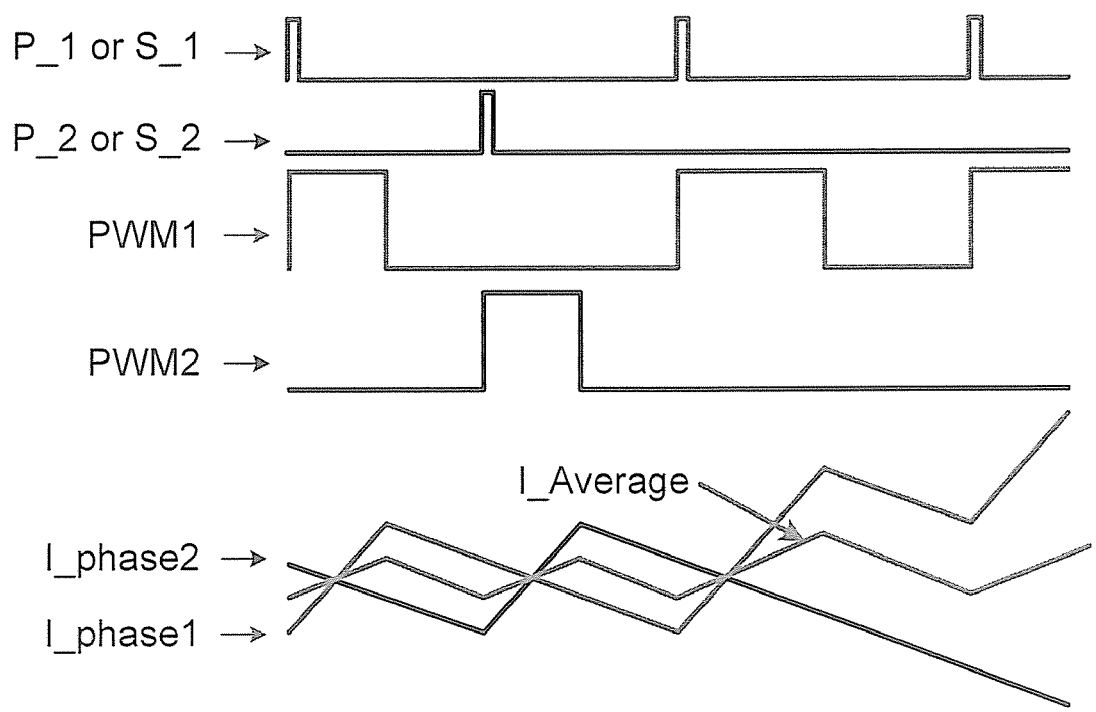
Figure 6B:
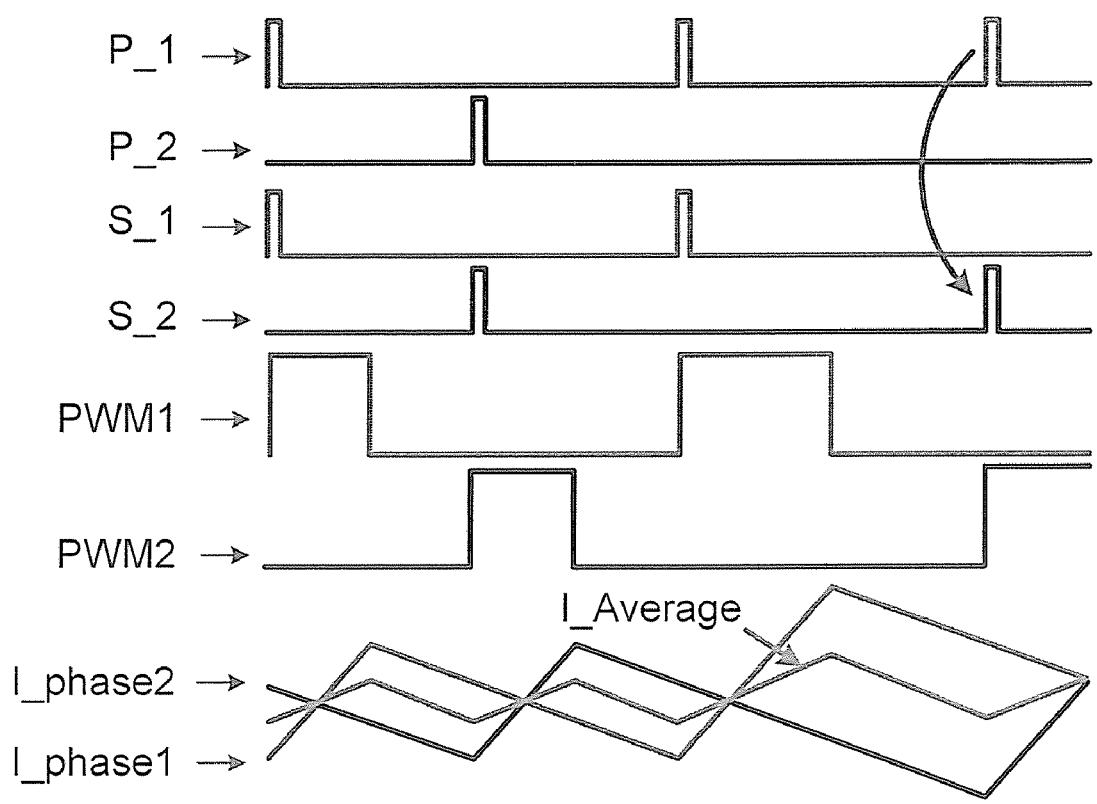
FIG. 6(b) shows simulated waveforms from an exemplary 2-phase system having an AFO scheme according to the invention.

Simulated operational waveforms of an exemplary 2-phase system based on the known APP control is shown in FIG. 6(*a*), while FIG. 6(*b*) shows simulated waveforms from an exemplary 2-phase system having an AFO scheme according to the present invention. Using APP™, signals associated with a particular phase, trigger only that phase. Thus, P_1 and S_1 only function to trigger PWM-1 pulses for phase 1. The known APP scheme shown in FIG. 6(*a*) evidences phase #2 missing one pulse, while the current in phase #1 has two successive PWM pulses. Therefore, the difference between the currents in phase #1 and #2 becomes large. In contrast, with the AFO scheme according to the invention shown in FIG. 6(*b*), signals associated with any particular phase can trigger any phase. For example, FIG. 6(*b*) shows the AFO controller according to the invention outputting S_2 responsive to P_1 (see the arrow provided in FIG. 6(*b*) from the far right P_1 pulse to the corresponding S_2 pulse) which triggers a pulse from PWM_2. FIG. 6(*b*) shows the PWM pulses being distributed evenly between phases, resulting in much better current balance between the respective phases as compared the performance provided by an APP modulator with AFO control shown in FIG. 6(*a*).

Figure 7:
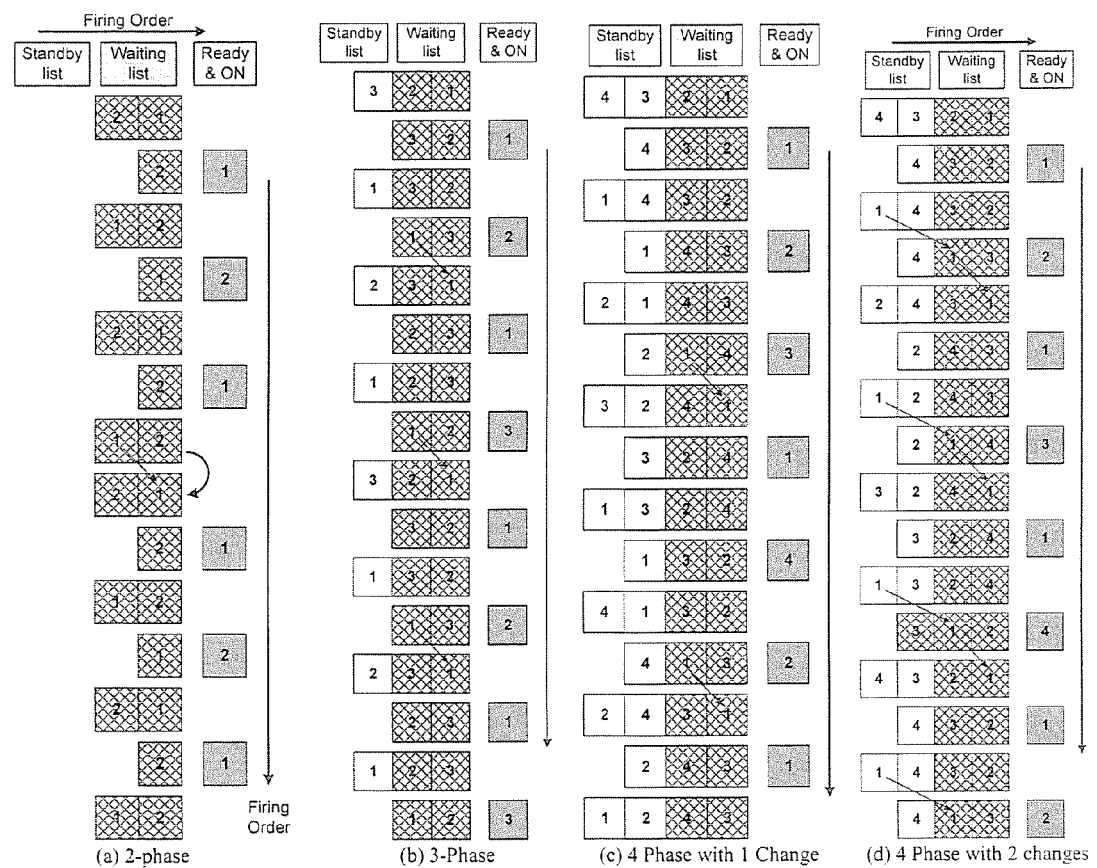
FIG. 7(a)-(d) illustrates an exemplary AFO scheme showing the resulting filing sequence which is based on the phase current information for a 2-phase system, a 3-phase system, a 4-phase system with 1 change and a 4-phase system with 2 changes, respectively, wherein phase 1 provides the lowest phase output current.

FIG. 7(*a*)-(*d*) illustrates an exemplary AFO scheme which is based on the phase current information for a 2-phase system, a 3-phase system, a 4-phase system with 1 change and a 4-phase system with 2 changes, respectively, where phase 1 provides the lowest output current. The dark colored boxes represent the phases which are ready and on. The cross-hatched boxes are the phases on the waiting list which are ready to be turned on next, and the light colored boxes are on standby list. Only the order of the two phases on the waiting list will be adjusted based on their currents, such as the 10% exemplary current difference basis shown in FIG. 7(*a*), which as described below can be implemented, for example, using a comparator with hysterisis. Specifically, the phase with less current (phase 1) will move ahead of the phase with more current, phase 2 in FIG. 7(*a*), such as when the phase 2 is 1.1× the phase 1 current, so that phase 1 fires twice in succession. For 4 or more phase systems, one or more comparators and adjustment blocks can be added to move the phase with less current forward faster in the queue with the results shown FIGS. 7(*c*); one change) and 7(*d*); two changes).

Figure 8:
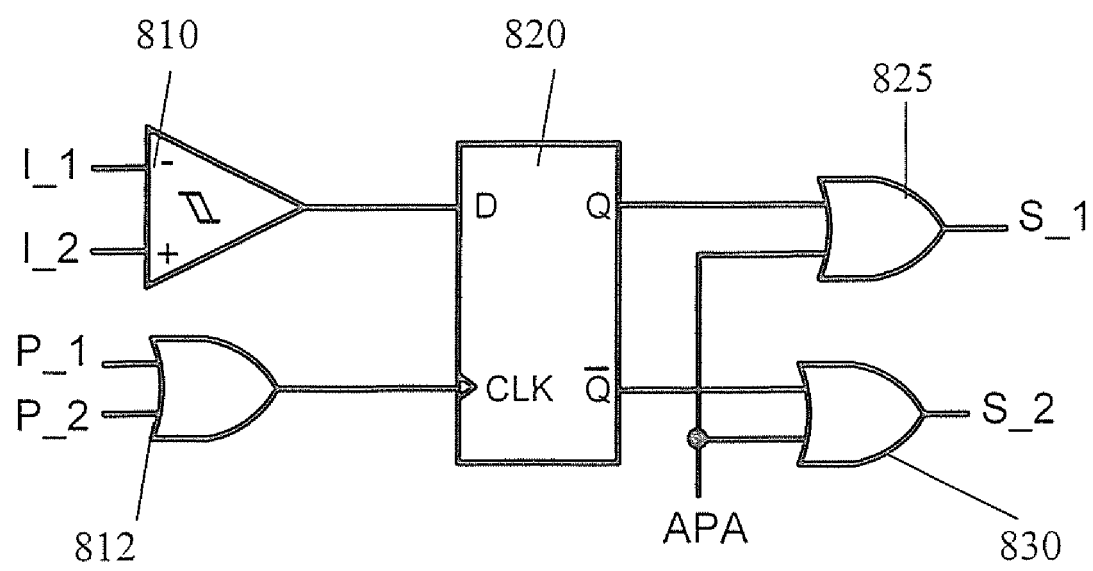
FIG. 8 shows a simplified exemplary AFO circuit for a 2-phase system which includes a current comparator for comparing I_1 and I_2.

FIG. 8 shows an exemplary AFO controller 800 for a 2-phase system which includes a current comparator 810 for comparing I_1 and I_2 which is coupled to a D flip flop 820. OR gate 812 receives and sums the phase pulses P-1 and P-2 into a summing signal at its output which is coupled to the clock input of D flip flop 820. The respective outputs of flip flop 820 are coupled to OR gates 825 and 830 respectively, which are each shown receiving an APA input. The threshold current difference may be set, for example, by configuring comparator 810 to have hysterisis.

Figure 9:
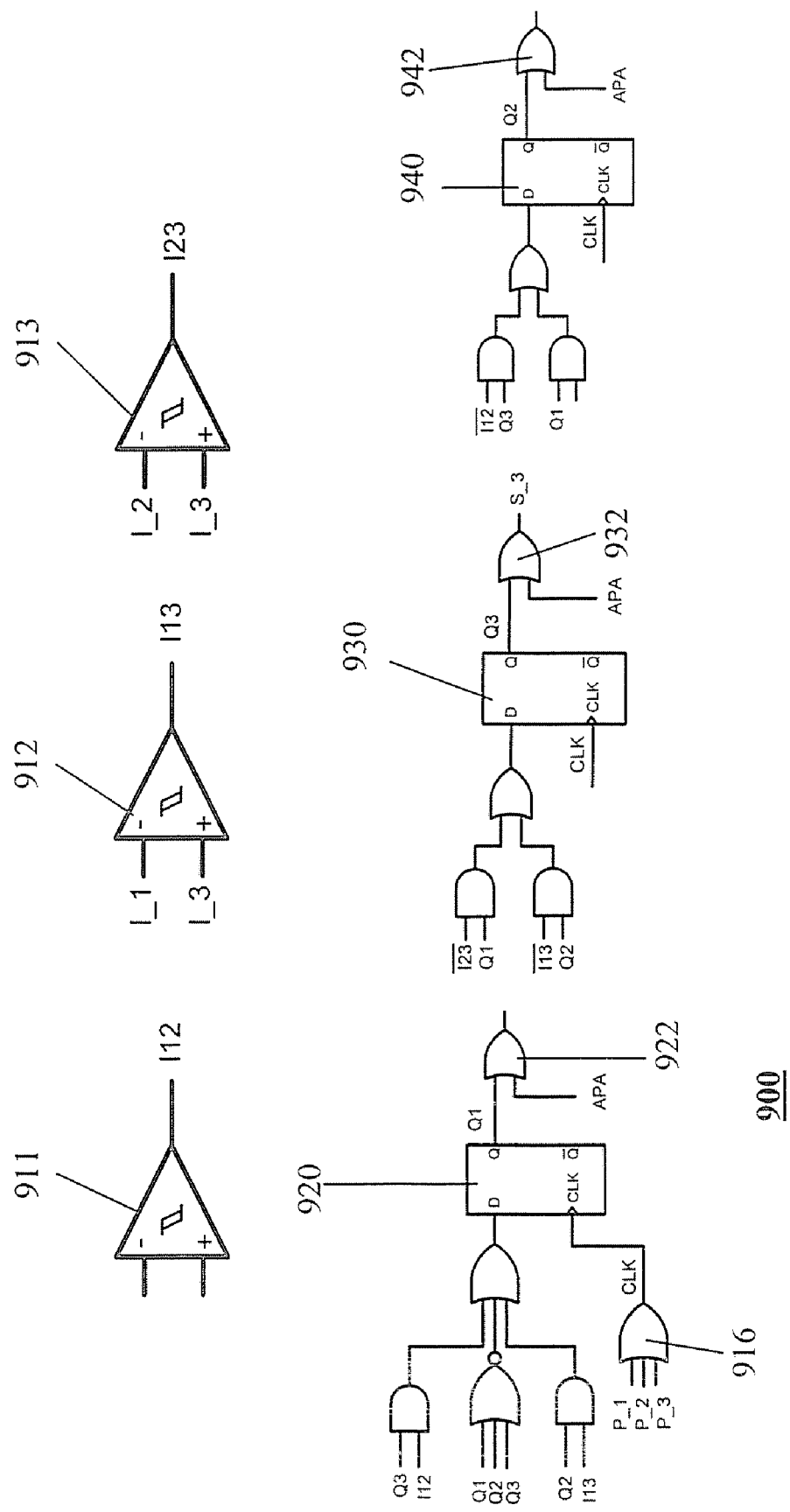
FIG. 9 shows an exemplary AFO circuit for a 3-phase system.
Figure 10A:
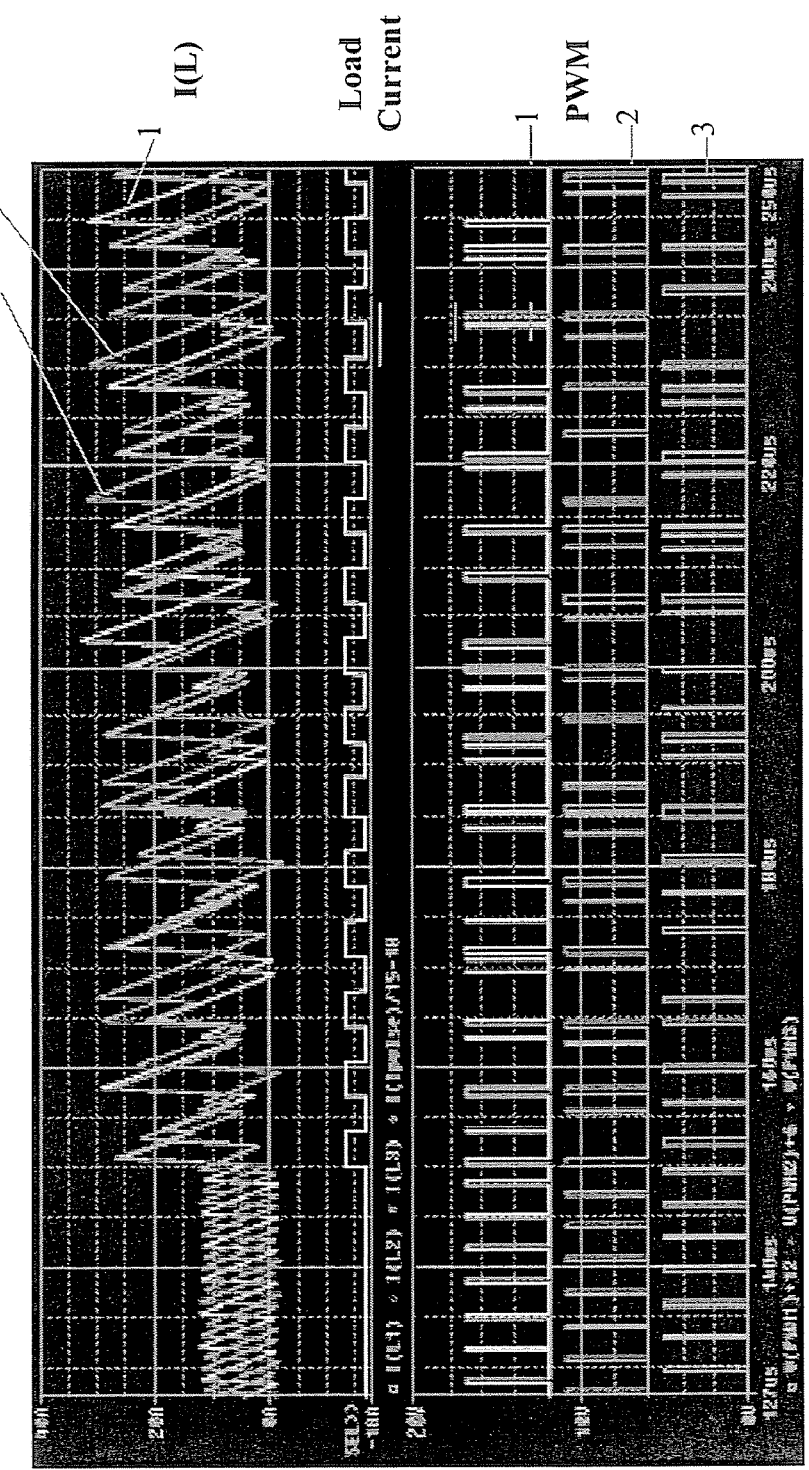
FIG. 10(a)-(f) shows simulation results for a 3-phase converter system according to the invention based APP™ modulation and AFO control using the AFO circuit shown in FIG. 9 together with simulation results from a known 3-phase converter system based on APP™ modulation without AFO control. The current balance is seen to be significantly improved by the 3-phase converter with AFO control according to the present invention.
Figure 10B:
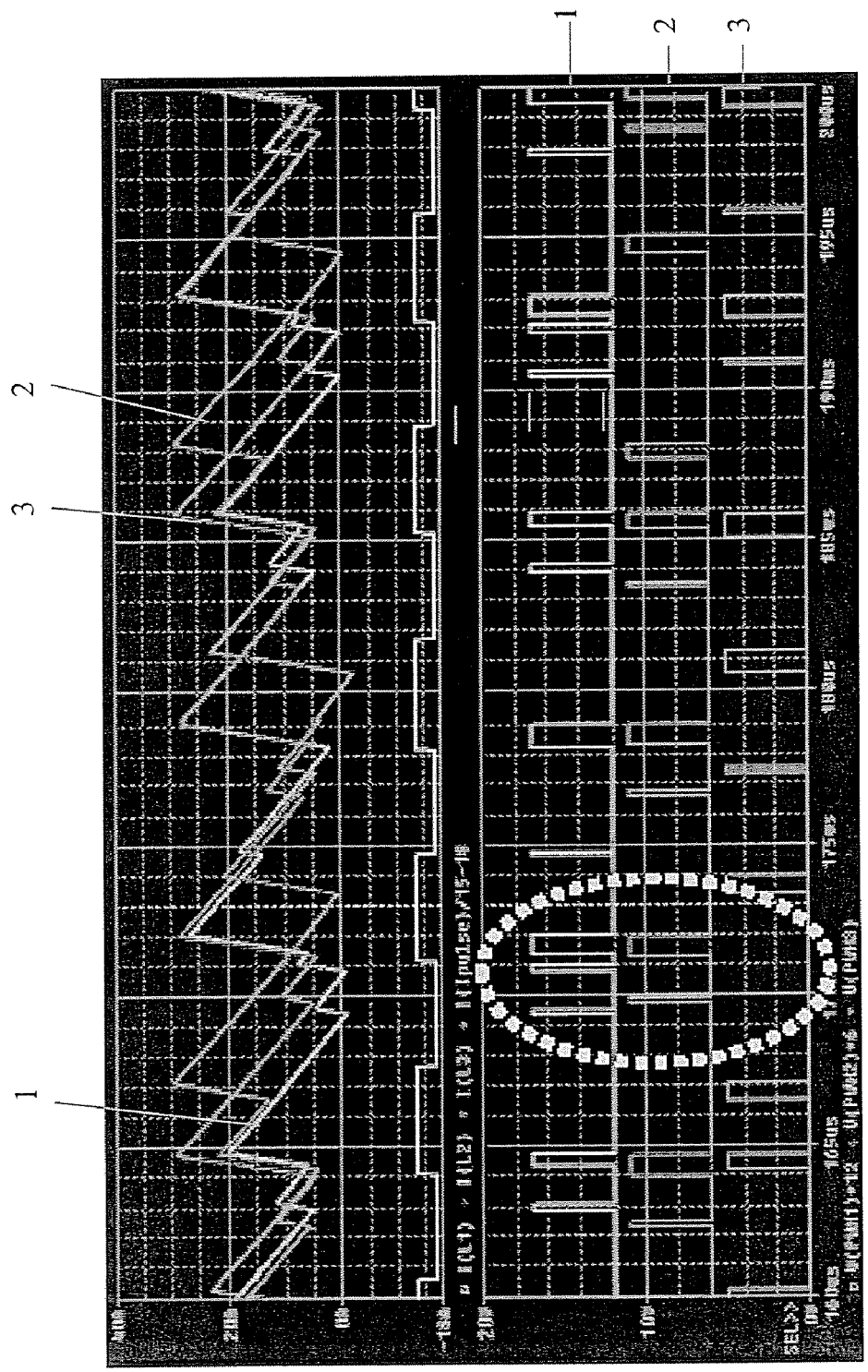
Figure 10C:
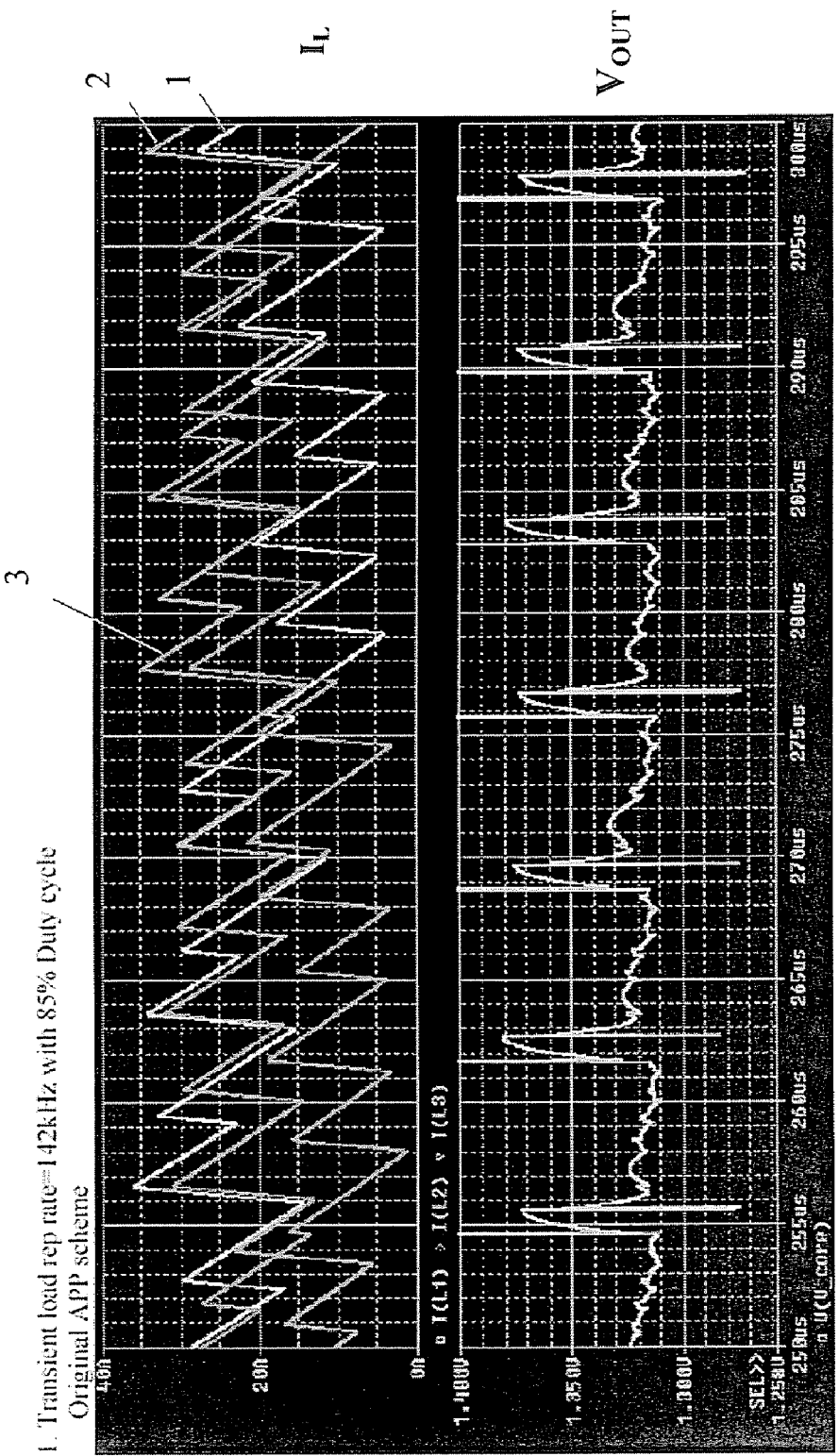
Figure 10D:
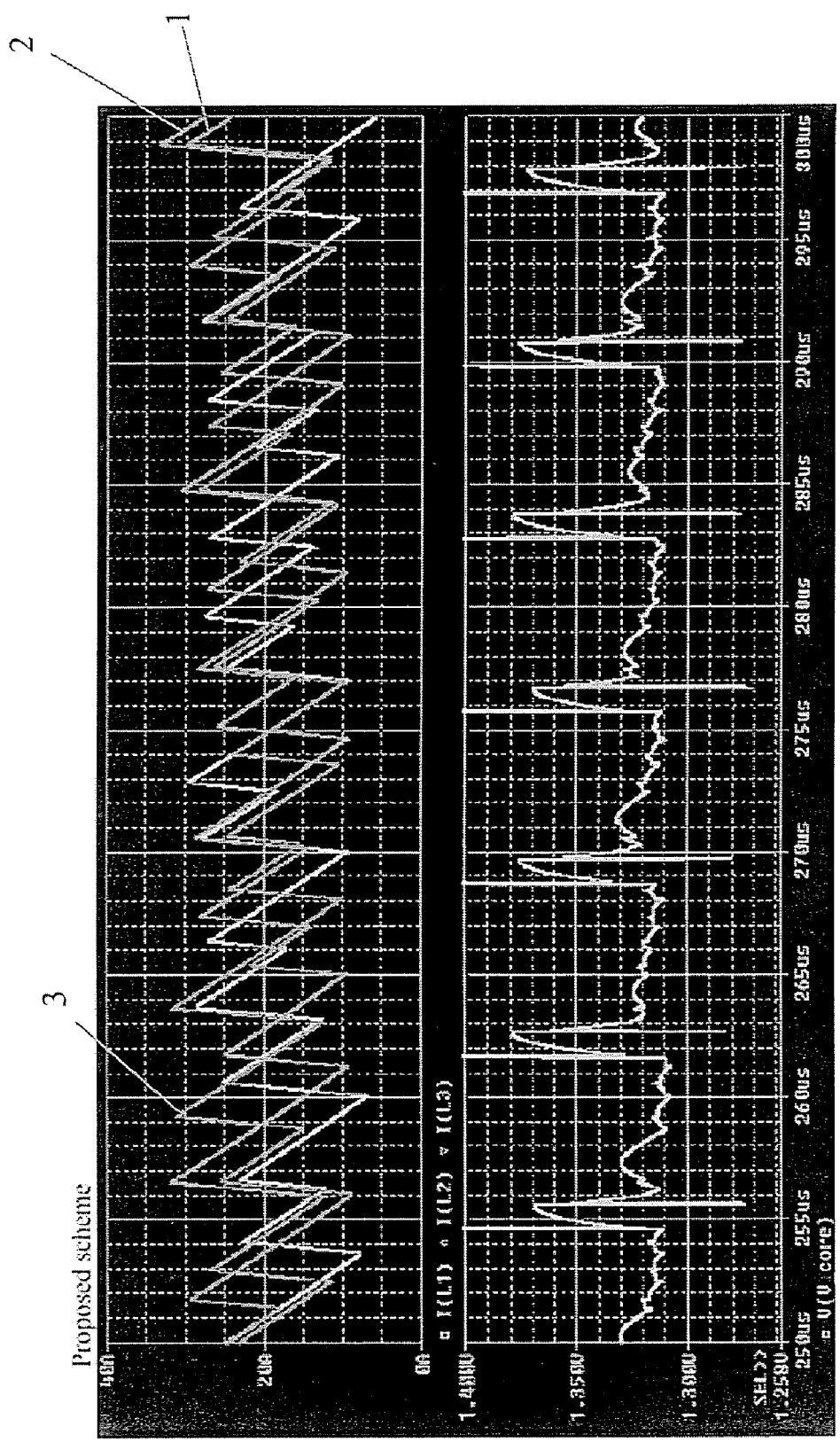
Figure 10E:
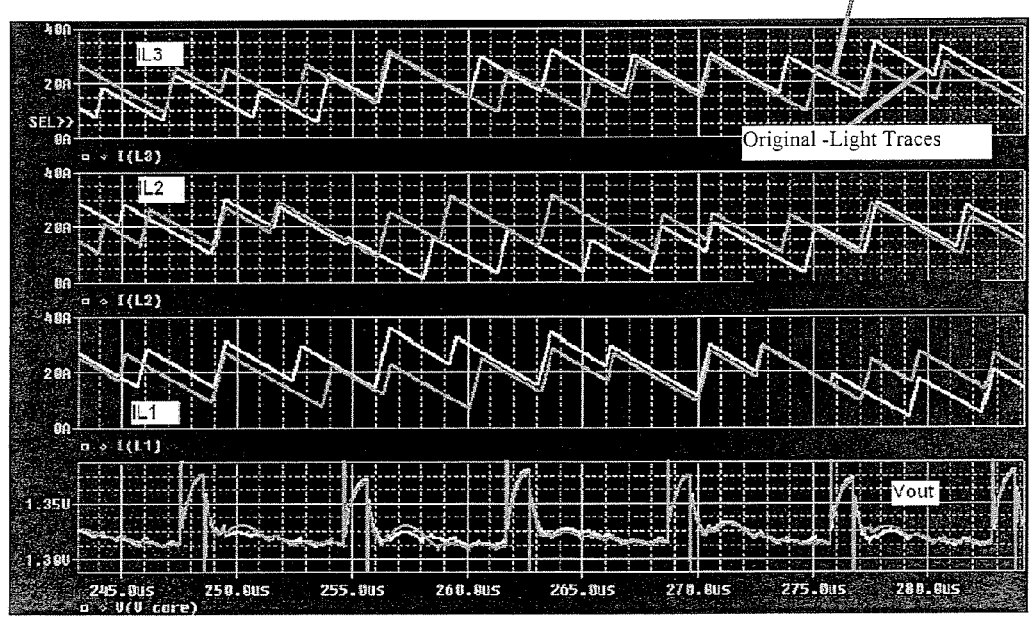
Figure 10F:
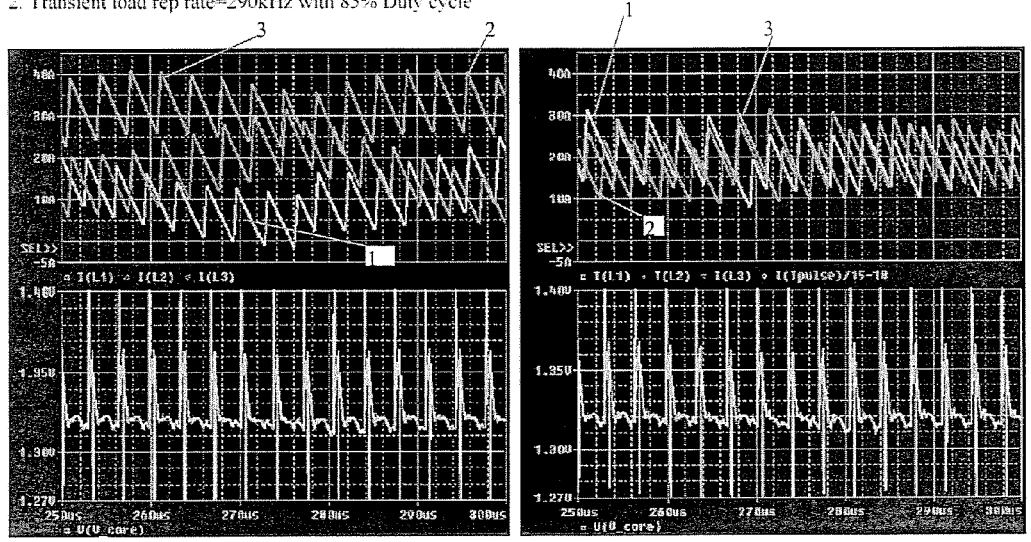

FIG. 9 shows an simplified exemplary AFO controller 900 for a 3-phase system. AFO controller 900 includes current comparator 911, 912 and 913 which compare the respective phase currents. Logic circuitry for each phase coupled to the respective D inputs of flip flops 920, 930 and 940 are shown receiving and processing flip flop Q outputs (Q1, Q2 and Q3), and outputs from current comparators 911-913 ($I_{12}$, $I_{13}$, $I_{23}$). OR gate 916 receives and sums the respective phase pulses P.1, P.2 and P.3 into a summing signal at its output which is coupled to each of the clock inputs of D flip flops 920 (for phase 1), 930 (for phase 2), and 940 (for phase 3). The Q outputs of the respective D flip flops are showed input to respective OR gates 922, 932 and 942 together with an APA™ input. The circuits for a 4-phase system and higher are just a higher order version of the circuit for the 3-phase system.

In FIGS. 10(*a*)-(*f*) as described below, simulation results for a 3-phase converter comprising an APP™ modulator and the AFO circuit 900 shown in FIG. 9 (hereafter an "APP™/ AFO modulator") together with simulation results from a 3-phase converter system comprising an APP™ modulator without AFO. FIG. 10(*a*) shows imbalanced phase current from a converter according to the present invention comprising an APP™/AFO modulator, with APA™ disabled. The traces shown are top to bottom: inductor current I(L1), I(L2), I(L(3), load current, and the respective PWMs, while FIG. 10(*b*) is zoom-in waveforms of the same. The circled region shows a missed pulse. The missed pulse for phase #3 in FIG. 10(*b*) prevents the current in phase #3 from increasing too high. Specifically, phase #3 current is seen to be too high at about 170 μs. AFO control according to the invention is thus shown shutting down phase 3 and allowing phase #1 and #2 to be sequenced on to push their current to close to phase #3 to achieve better current balance.

FIG. 10(*c*) shows imbalanced phase current from a known three phase converter comprising an APP™ PWM modulator without AFO control where the traces shown are top to bottom: inductor current [I(L1), I(L2), I(L(3)] and Vout showing a high frequency transition, while FIG. 10(*d*) shows the resulting waveforms from a converter comprising APP™/ AFO according to the present invention. The transient load rep rate was 142 kHz with a 85% duty cycle. FIG. 10(*e*) compares the traces in FIG. 10(*c*) to traces in FIG. 10(*d*), the current balance is seen to be significantly improved with the added AFO control according to the present invention. FIG. 10(*f*) repeats the comparison shown in FIGS. 10(*c*)-(*e*), except at a transient load repetition rate of 290 kHz (same 85% duty cycle), wherein the left panel is the known APP scheme, while the right panel shows resulting waveforms from a multiphase converter comprising an APP™/AFO modulator according to the invention. As before, the simulated current balance is seen to be significantly improved with a multiphase converter comprising APP™/AFO according to the present invention as compared to a known multiphase converter comprising an APP™ modulator not having AFO control.

The present invention can be used with a variety of multiphase voltage regulator, such as, but not limited to DC-DC regulators.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

We claim:

1. An adaptive firing order (AFO) controlled multi-phase power converter, comprising:
    a plurality of parallel connected regulator phases controlled by respective pulse width modulation (PWM) signals, said regulator phases each comprising at least one driver having an input coupled to receive said PWM signals, and an output stage comprising at least one output transistor having an input coupled to an output of said driver, said output stage operable for driving an inductor in series with a capacitor, wherein outputs of said regulator phases taken across said capacitor are tied together to provide an output of said converter ($V_{OUT}$), said $V_{OUT}$ generating a load current across a load when connected across said capacitor, and
    a PWM modulator comprising:
    a multiphase leading edge generator comprising pulse generating circuitry associated with each of said regulator phases, said pulse generating circuitry generating phase pulses associated with each of said phases;
    an AFO controller, said AFO controller having circuitry including a mixer for receiving and summing said phase pulses into a summing signal and using said summing signal to generate a series of turn-on pulses therefrom, and
    a multiphase PWM generator having inputs coupled to an output of said AFO controller coupled to receive said series of turn-on pulses, said multiphase PWM generator having circuitry for generating said PWM signals therefrom.

2. The converter of claim 1, wherein said AFO controller includes at least one D flip flop, wherein said summing signal is coupled to a clock input of said D-flip flop.

3. The converter of claim 1, wherein said AFO controller includes a plurality of D flip flops, one of said D flip flops for each of said phases, wherein said summing signal is coupled to a clock input of each of said plurality of D-flip flops.

4. The converter of claim 1, wherein said leading edge generator comprises a down ramp comparator for each of said phases, wherein a COMP signal from an error amplifier is coupled to an inverting input of said down ramp comparator and a down ramp signal to its non-inverting input, and said multiphase PWM generator comprises an up-ramp comparator and an SR flip-flop for each of said phases, wherein said COMP signal is coupled to an inverting input and an up ramp signal to its non-inverting input, wherein an output of said up ramp comparator is coupled an R input of said SR flip-flops, and said series of turn-on pulses to S inputs of said SR flip flops, outputs of said SR flip-flops providing said PWM signals.

5. The converter of claim 4, wherein outputs of said down-ramp comparators are coupled to inputs of said AFO controller along with a non-linear control input and a signal representative of current delivered by said regulator phases.

6. The converter of claim 1, wherein said series of turn-on pulses from said AFO controller are treated as a master clock signal, slave signals derived from said master clock signal being sent to each of said phases in a predetermined fixed order, whereby a fixed firing order of said phases is provided.

7. The converter of claim 1, wherein signals indicative of phase currents associated with each of said phases are provided as inputs to said AFO controller, said AFO controller generating turn on pulses to said PWM generator based on respective levels of said phase currents, whereby a firing order of said phases is dynamically adjusted based on said phase currents.

8. The converter of claim 6, wherein said AFO controller generates said turn on pulses to turn on respective ones of said phases which provide less phase current more frequently by sending more of said turn-on pulses relative to others of said phases.

9. A pulse width modulation (PWM) modulator, comprising:
    a multiphase leading edge generator comprising pulse generating circuitry associated with each of a plurality of regulator phases, said pulse generating circuitry generating phase pulses associated with each of said phases;
    an adaptive firing order (AFO) controller, said AFO controller having circuitry including a mixer for receiving and summing said phase pulses into a summing signal and using said summing signal to generate a series of turn-on pulses therefrom, and
    a multiphase PWM generator having inputs coupled to an output of said AFO controller coupled to receive said series of turn-on pulses, said multiphase PWM generator having circuitry for generating PWM signals therefrom.

10. The modulator of claim 9, wherein said AFO controller includes at least one D flip flop, wherein said summing signal is coupled to a clock input of said D-flip flop.

11. The modulator of claim 9, wherein said AFO controller includes a plurality of D flip flops, one of said D flip flops for each of said phases, wherein said summing signal is coupled to a clock input of each of said plurality of D-flip flops.

12. The modulator of claim 9, wherein said leading edge generator comprises a down ramp comparator for each of said phases, wherein a COMP signal from an error amplifier is coupled to an inverting input of said down ramp comparator and a down ramp signal to its non-inverting input, and said multiphase PWM generator comprises an up-ramp comparator and an SR flip-flop for each of said phases, wherein said COMP signal is coupled to an inverting input and an up ramp signal to its non-inverting input, wherein an output of said up ramp comparator is coupled an R input of said SR flip-flops, and said series of turn-on pulses to S inputs of said SR flip flops, outputs of said SR flip-flops providing said PWM signals.

13. The modulator of claim 12, wherein outputs of said downramp comparators are coupled to inputs of said AFO controller along with a non-linear control input and a signal representative of current delivered by said regulator phases.

14. The modulator of claim 9, wherein said series of turn-on pulses from said AFO controller are treated as a master clock signal, slave signals derived from said master clock signal being sent to each of said phases in a predetermined fixed order, whereby a fixed firing order of said phases is provided.

15. The modulator of claim 9, wherein signals indicative of phase currents associated with each of said phases are provided as inputs to said AFO controller, said AFO controller generating turn on pulses to said PWM based on respective levels of said phase currents, whereby a firing order of said phases is dynamically adjusted based on said phase current.

16. The modulator of claim 14, wherein said AFO controller generates said turn on pulses to turn on respective ones of said phases which provide less phase current more frequently by sending more of said turn-on pulses relative to others of said phases.

17. A method for improved dynamic current balance for multiphase voltage regulators, comprising the steps of:

providing a multiphase voltage regulator having a plurality of parallel connected regulator phases controlled by a multiphase PWM generator which generates pulse width modulator (PWM) signals for respective ones of said regulator phases;

generating phase pulses associated with each of said phases;

mixing said phase pulses into a summing signal and using said summing signal to generate a series of turn-on pulses therefrom;

applying said series of turn-on pulses as inputs to said multiphase PWM generator, wherein said series of turn-on pulses determines a firing order of respective ones of said regulator phases.

18. The method of claim 17, wherein said firing order is a fixed order.

19. The method of claim 17, wherein said mixing step comprises receiving output current information from each of said regulator phases.

20. The method of claim 19, further comprising the step of using said output current information to change a frequency of said turn-on pulses to said regulator phases, wherein said phases which provide low output current receive said turn-on pulses at a higher frequency as compared to said phases which provide higher output current.

* * * * *

UNITED STATES PATENT AND TRADEMARK OFFICE
CERTIFICATE OF CORRECTION

PATENT NO. : 7,592,787 B2 Page 1 of 1
APPLICATION NO. : 11/694308
DATED : September 22, 2009
INVENTOR(S) : Weihong Qiu et al.

It is certified that error appears in the above-identified patent and that said Letters Patent is hereby corrected as shown below:

Title Page
Within Section (75) Inventors: Please replace Weihong Qui with Weihong Qiu.

Signed and Sealed this

First Day of June, 2010

David J. Kappos
*Director of the United States Patent and Trademark Office*